United States Patent
Ratner et al.

(10) Patent No.: US 8,085,849 B1
(45) Date of Patent: Dec. 27, 2011

(54) AUTOMATED METHOD AND APPARATUS FOR ESTIMATING MOTION OF AN IMAGE SEGMENT USING MOTION VECTORS FROM OVERLAPPING MACROBLOCKS

(75) Inventors: Edward R. Ratner, Los Altos, CA (US); Schuyler A. Cullen, Mt. View, CA (US)

(73) Assignee: Keystream Corporation, Mountain View, CA (US)

( * ) Notice: Subject to any disclaimer, the term of this patent is extended or adjusted under 35 U.S.C. 154(b) by 1092 days.

(21) Appl. No.: 11/981,455

(22) Filed: Oct. 30, 2007

Related U.S. Application Data

(60) Provisional application No. 60/864,304, filed on Nov. 3, 2006.

(51) Int. Cl.
 *H04N 7/28* (2006.01)
(52) U.S. Cl. .................................. 375/240.16
(58) Field of Classification Search .................. None
 See application file for complete search history.

(56) References Cited

U.S. PATENT DOCUMENTS

| | | | |
|---|---|---|---|
| 5,742,710 A * | 4/1998 | Hsu et al. ........................ | 382/236 |
| 5,805,736 A | 9/1998 | Kim | |
| 6,005,980 A | 12/1999 | Eifrig et al. | |
| 6,026,195 A | 2/2000 | Eifrig et al. | |
| 6,618,439 B1 | 9/2003 | Kuo et al. | |
| RE38,564 E | 8/2004 | Eifrig et al. | |
| 6,931,065 B2 | 8/2005 | Kim | |
| 2003/0123547 A1 * | 7/2003 | Song ........................ | 375/240.13 |
| 2003/0123551 A1 | 7/2003 | Kim | |
| 2004/0247154 A1 * | 12/2004 | Bodo et al. ..................... | 382/100 |
| 2005/0201463 A1 * | 9/2005 | Lee et al. .................. | 375/240.16 |
| 2006/0092280 A1 * | 5/2006 | Kamijo et al. ................. | 348/169 |
| 2006/0098737 A1 * | 5/2006 | Sethuraman et al. ..... | 375/240.16 |
| 2007/0064804 A1 * | 3/2007 | Paniconi et al. .......... | 375/240.16 |
| 2009/0268819 A1 * | 10/2009 | Nishida ..................... | 375/240.16 |
| 2010/0208812 A1 * | 8/2010 | Murakami et al. ........ | 375/240.12 |

OTHER PUBLICATIONS

Shan Zhu and Kai-Kuang Ma, "A New Diamond Search Algorithm for Fast Block-Matching Motion Estimation", IEEE Transactions on Image Processing, vol. 9, No. 2, Feb. 2000, pp. 287-290.

* cited by examiner

*Primary Examiner* — Hassan Phillips
*Assistant Examiner* — Duc Duong
(74) *Attorney, Agent, or Firm* — Okamoto & Benedicto LLP

(57) ABSTRACT

One embodiment relates to an automated method for estimating motion of an image segment. An image frame is segmented into irregularly-shaped image segments. Motion vectors of blocks of pixels in the image frame are estimated. A determination is made as to the blocks which overlap a segment, and candidate motion vectors are determined from the motion vectors for those overlapping blocks. A motion vector for the segment is selected from amongst the candidate motion vectors. Other embodiments, aspects, and features are also disclosed.

14 Claims, 6 Drawing Sheets

302

AUTOMATED METHOD AND APPARATUS FOR ESTIMATING MOTION OF AN IMAGE SEGMENT USING MOTION VECTORS FROM OVERLAPPING MACROBLOCKS

CROSS-REFERENCE TO RELATED APPLICATIONS

The present application claims the benefit of U.S. Provisional Patent Application No. 60/864,304, entitled "Apparatus And Method For Segment Motion Estimation Using Block Motion Vectors", filed Nov. 3, 2006, by inventors Edward Ratner and Schuyler A. Cullen, the disclosure of which is hereby incorporated by reference.

BACKGROUND

1. Field of the Invention

The present application relates generally to digital video processing and more particularly to the automated estimation of image segment motion.

2. Description of the Background Art

Video has become ubiquitous on the Web. Millions of people watch video clips everyday. The content varies from short amateur video clips about 20 to 30 seconds in length to premium content that can be as long as several hours. With broadband infrastructure becoming well established, video viewing over the Internet will increase.

DETAILED DESCRIPTION

Video watching on the Internet is, today, a passive activity. Viewers typically watch video streams from beginning to end much like they do with television. In contrast, with static Web pages, users often search for text of interest to them and then go directly to that Web page by clicking on an appropriate icon. To create analogous capabilities for full motion video, the capability for a user to click on moving objects would be highly desirable.

However, creating "clickable" objects in video is currently not very easy. It is possible to manually go through every frame and "hot spot" or outline the clickable object. However, manual outlining is, clearly, a very time-consuming, expensive process that will not provide a scalable solution as video viewing continues to explode over the Internet Applicants believe that a significantly better method would involve automated tracking of objects from frame to frame, so that a hot spot or outline would only need to be selected once—either manually or by an automatic algorithm, for a source frame. The object may then be tracked in an automated manner for other frames in a same sequence or group of pictures as the source frame.

Figure 8:
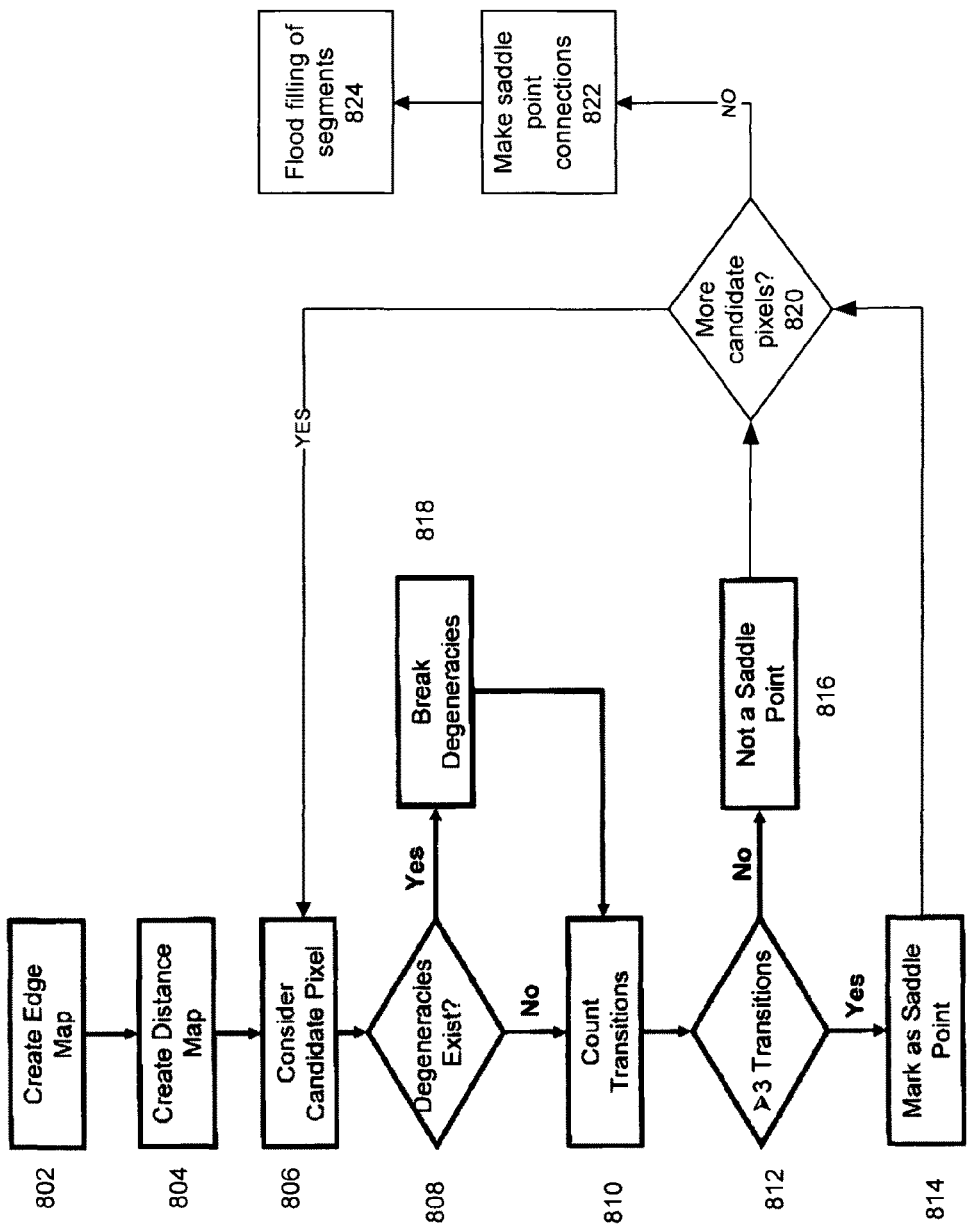
FIG. 8 is a flowchart of a method of efficient image segmentation using automated saddle-point detection in accordance with an embodiment of the invention.

An object is, in general, composed of one or more, arbitrarily-shaped image segments. In the preferred embodiment, an image segmentation technique is used such that an object can be broken up into more than one segment; however, it is very rare that a segment would be shared between two different objects. An example of such a segmentation method is described below in relation to FIG. 8. Other segmentation methods may also be utilized. Therefore, automated tracking of the object requires the ability to perform motion estimation on image segments of arbitrary shapes.

The method and apparatus disclosed herein enable motion estimation of arbitrarily-shaped image segments in a video stream in an effective and efficient manner. Motion estimation, in general, is a process to find a translation vector that, when applied to a portion of an image (source image), produces a minimal error in some metric against a target image. Since a minimum of the error over the possible translation vectors is desired, the problem posed in this straight-forward way requires a search using a segment template over the target image to find the translation vector which produces the minimal error. Such a search is, unfortunately, highly computationally intensive.

The present application relates to an efficient technique for motion estimation for image segments of arbitrary shape. This technique takes advantage of the fact that block motion estimation has been worked on extensively in the last few years. Due to regular memory access patterns, a number of highly efficient block motion estimation schemes currently exist in either software or hardware implementations.

In particular, the present application discloses a computer-automated method and apparatus for efficiently estimating the motion of an arbitrarily-shaped image segment utilizing motion vectors from an overlay of macroblocks. As described further below, the motion vectors from the macroblocks may be leveraged to generate a small number of candidate motion vectors for each segment. The error for each potential candidate motion vector may then be computed for the segment, and the candidate motion vector with the lowest error may be selected as the estimated motion vector for the segment.

Figure 1:
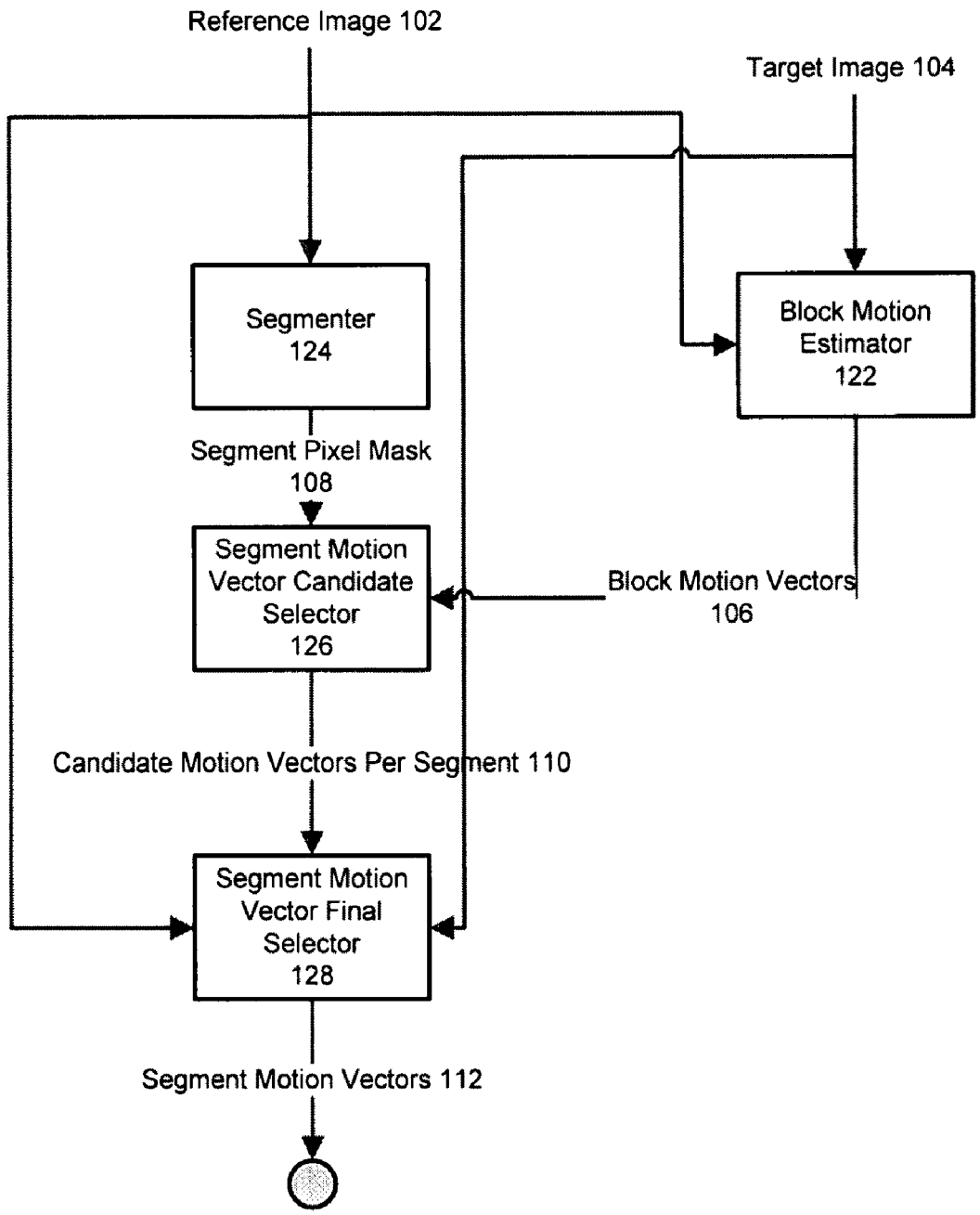
FIG. 1 is a schematic diagram depicting an automated method using software or hardware circuit modules for estimating image segment motion using motion vectors from overlapping blocks in accordance with an embodiment of the invention.

FIG. 1 is a schematic diagram depicting an automated method using software or hardware circuit modules for estimating image segment motion using motion vectors from an overlay of blocks in accordance with an embodiment of the invention. Applicants have determined that this automated method is highly efficient and typically requires substantially fewer computational cycles than prior techniques.

A source (reference) image frame 102 and a target image frame 104 are input into a block motion estimator 122. The block motion estimator 122 is a module (implementable either in software or hardware) to perform motion estimation on macroblocks or blocks of pixels in the source image frame 102 relative to the target image frame 104. For example, in one embodiment, each image frame may be divided into uniform 8 pixel by 8 pixel (8×8) macroblocks. The block motion estimator 122 may output its results in the form of block motion vectors 106.

The block motion estimator 122 performs a search to find a translation (motion) vector for each macroblock such that the difference between its translated pixel values and the corresponding pixel values in the target image frame 104 are minimized. In a preferred embodiment, a hierarchical diamond search for the minimum sum of absolute differences (SAD) may be utilized. This search method is disclosed in Shan Zhu and Kai-Kuang Ma, "A New Diamond Search Algorithm for Fast Block-Matching Motion Estimation," IEEE Transactions on Image Processing, Vol. 9, February 2000.

Meanwhile, the source image frame 102 may be segmented by a segmenter 124. As shown in FIG. 1, the segmenter 124 and the block motion estimator 122 may operate in parallel for efficiency, or they may operate serially (either one first), depending on the system. The segmenter 124 is a module (implementable either in software or hardware) to divide the source image frame 102 into image segments of arbitrary shape.

Various segmentation algorithms may be utilized by the segmenter 124. For example, one segmentation algorithm which may be used is described below in relation to FIG. 8. Other segmentation algorithms may also be used.

Figure 2:
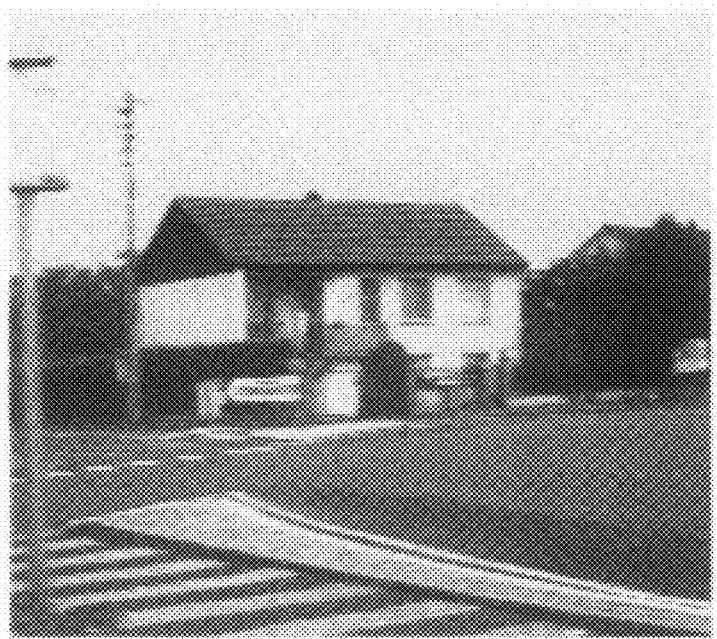
FIG. 2 is an example image frame from a digital video sequence for purposes of discussion of the automated method for estimating image segment motion in accordance with an embodiment of the invention.
Figure 3:
FIG. 3 depicts a segmentation of the example image frame of FIG. 2 in accordance with an embodiment of the invention.
Figure 4:
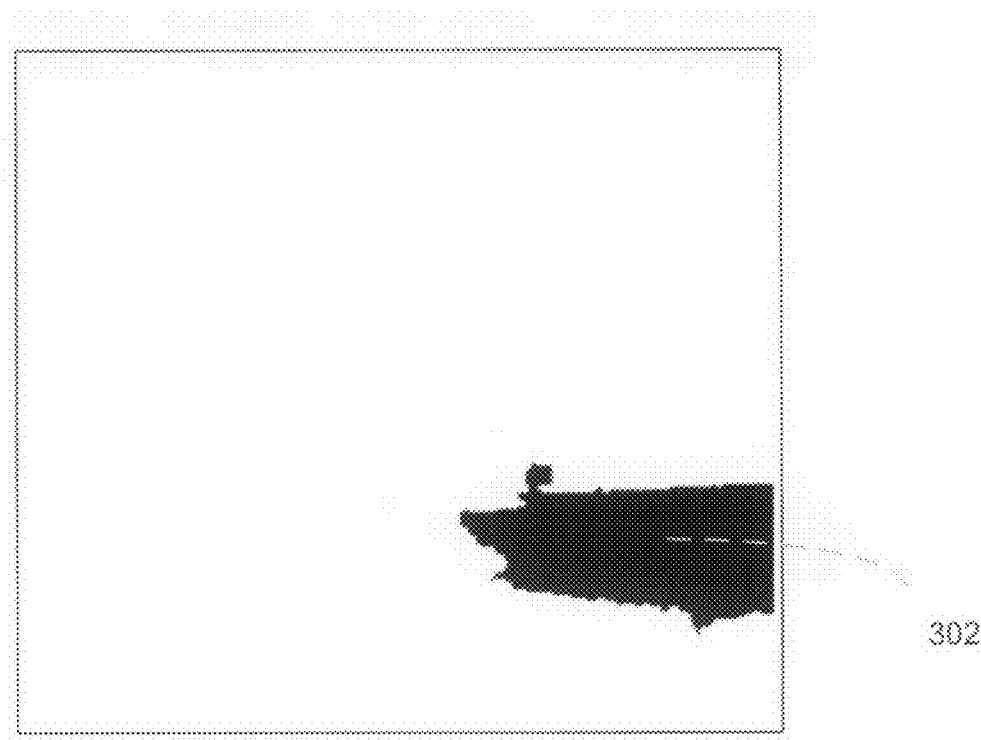
FIG. 4 depicts, in isolation, the example image segment of arbitrary shape from the segmentation of FIG. 3.

FIG. 2 is an example image frame from a digital video sequence for purposes of discussion of the automated method for estimating image segment motion in accordance with an embodiment of the invention. The example image frame shows a house on a street corner. FIG. 3 depicts a segmentation of the example image frame of FIG. 2 in accordance with an embodiment of the invention. In FIG. 3, shadings are used to denote different segments. The segmentation may be output by the segmenter 124 in the form of a segment pixel mask 108. For purposes of the following discussion, consider in particular the arbitrarily-shaped image segment 302 which is indicated in FIG. 3. The example image segment 302 from FIG. 3 is shown in isolation in FIG. 4.

Figure 5:
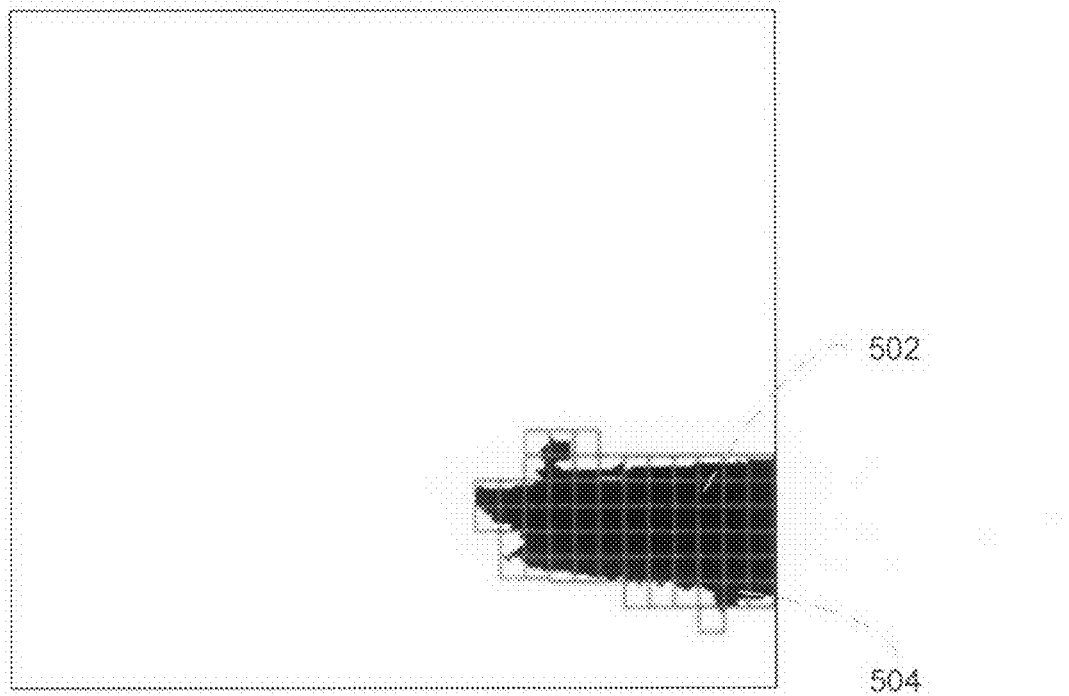
FIG. 5 depicts macroblocks overlapping the example arbitrarily-shaped image segment as determined in accordance with an embodiment of the invention.

Returning to FIG. 1, the segment pixel mask 108 from the segmenter 124 and the block motion vectors 106 from the block motion estimator 122 may be input into a segment motion vector candidate selector 126. For each segment, the segment motion vector candidate selector 126 determines the blocks or macroblocks that overlap, fully or partially, with that segment. FIG. 5 depicts macroblocks overlaying the example arbitrarily-shaped image segment 302 as determined in accordance with an embodiment of the invention. Denoted in FIG. 5, for example, are a fully overlapping (overlying) macroblock 502 and a partially overlapping (overlying) macroblock 504.

Some of the partially overlapping macroblocks overlap substantially, while others overlap only insubstantially with the segment 302. The difference between substantial and insubstantial overlap may be determined, for example, by a threshold number of pixels, such that blocks overlapping more than the threshold number of pixels of the segment are considered to have substantial overlap. In this particular example, there are sixty-three (63) macroblocks that overlap substantially with the segment 302.

Figure 6:
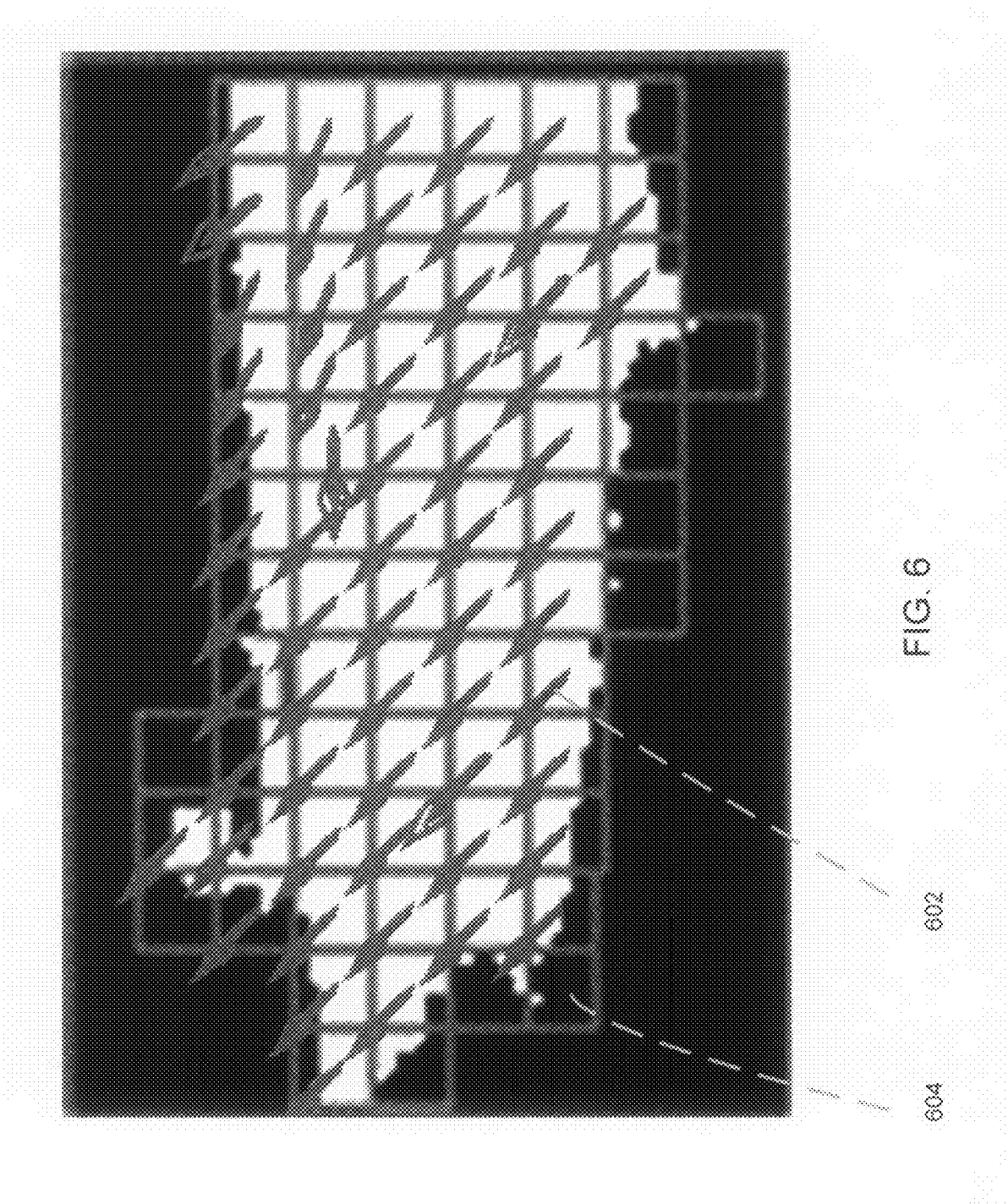
FIG. 6 depicts motion vectors of the substantially overlapping macroblocks in accordance with an embodiment of the invention.

The segment motion vector candidate selector 126 may then select the block motion vectors 106 associated with the substantially overlapping blocks to be the candidate motion vectors for the segment. FIG. 6 depicts motion vectors of the substantially overlapping macroblocks in accordance with an embodiment of the invention.

In the example being discussed, there may be up to 63 candidate motion vectors as there are 63 substantially overlapping blocks. However, most of the 63 blocks exhibit identical or highly similar motion since they are part of a same physical object in the video sequence. In this particular example, there are fourteen (14) unique motion vectors among the 63 blocks.

For each segment, candidate motion vectors 110 are output by the candidate selector 126. In a preferred embodiment, the candidate motion vectors 110 include both a) all unique motion vectors for the substantially overlapping macroblocks and b) the average of all the motion vectors for the substantially overlapping macroblocks. In an alternate implementation, the candidate motion vectors 110 may also include c) a "median" vector of all the motion vectors for the substantially overlapping macroblocks. In other implementations, any combination of a), b) and c) may be output.

A segment motion vector final selector 128 may be configured to receive as input the candidate motion vectors 110 per segment, as well as the pixel data for the source image frame 102 and the target image frame 104. The final selector 128 computes an error metric for the translated segment for each of the candidate motion vectors 110. For example, the error metric may comprise a sum of absolute differences (SAD). The candidate motion vector 110 with the lowest error metric is selected as the motion vector for that segment, and the segment motion vectors 112 (one for each segment of the segment pixel mask 108) are output by the final selector 128.

For example, a prior art technique would need to perform a 32×32 search resulting in about nine hundred error metric computations for the example segment 302 to determine its motion vector. In comparison, the technique discussed above would only need about fifteen error metric computations (fifteen assumes the candidate motion vectors 110 include all the individual motion vectors plus the average motion vector). This demonstrates the substantially greater efficiency of the presently-disclosed technique.

Thus, the wide search is performed only for regularly-shaped macroblocks, where the pixel data in memory may be accessed in a regular pattern with specialized software and/or hardware so as to make the required computations especially efficient. For the irregularly shaped segment, only a few error computations need to be performed, not significantly adding to the overall computational effort required. Hence, the presently-disclosed technique enables the automated determination of motion vectors for irregularly-shaped segments with relatively very little additional computations.

Figure 7:
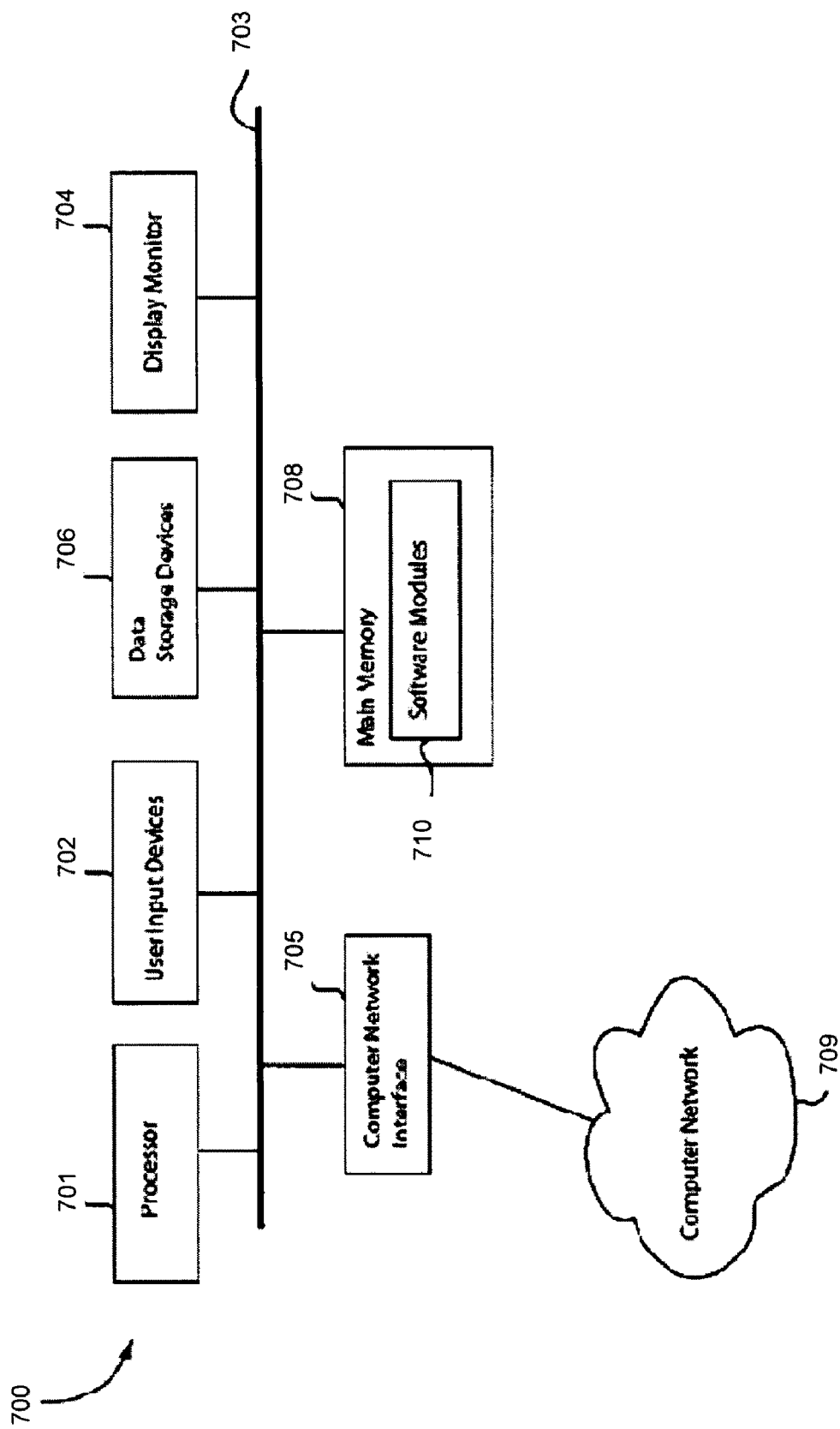
FIG. 7 is a schematic diagram of an example computer system or apparatus which may be used to execute the automated procedures for estimating image segment motion in accordance with an embodiment of the invention.

FIG. 7 is a schematic diagram of an example computer system or apparatus 700 which may be used to execute the automated procedures for estimating image segment motion in accordance with an embodiment of the invention. The computer 700 may have less or more components than illustrated. The computer 700 may include a processor 701, such as those from the Intel Corporation or Advanced Micro Devices, for example. The computer 700 may have one or more buses 703 coupling its various components. The computer 700 may include one or more user input devices 702 (e.g., keyboard, mouse), one or more data storage devices 706 (e.g., hard drive, optical disk, USB memory), a display monitor 704 (e.g., LCD, flat panel monitor, CRT), a computer network interface 705 (e.g., network adapter, modem), and a main memory 708 (e.g., RAM).

In the example of FIG. 7, the main memory 708 includes software modules 710, which may be software components to perform the above-discussed computer-implemented procedures. The software modules 710 may be loaded from the data storage device 706 to the main memory 708 for execution by the processor 701. The computer network interface 705 may be coupled to a computer network 709, which in this example includes the Internet.

The present method and system may use an object segmentation method that is implemented in software on general purpose microprocessor. The segmentation method performs well on a wide range of image content and one embodiment runs real-time for processing 720×480 video at 30 frames per second on a 1 GHz Pentium CPU. In accordance with an embodiment of the invention, the segmentation method 800 is depicted in the flow chart of FIG. 8 and comprises the following steps.

1) Edge detection is performed on the image per block 802 to create an edge mask or map. In accordance with one embodiment, Gaussian derivative filters are used to compute the gradient of the image values. Then local gradient maxima are detected. These are subject to a thresholding process, where the maxima with gradient magnitudes below a numerical threshold are discarded.

2) In block 804, a distance map is computed from the edge pixels, where each pixel in the distance map receives a value indicating its distance from the closest edge point. In one embodiment, the distance map is computed in two passes over the image frame, and involves only comparisons and increments by 1. The distance values are all integers. The pixels adjacent to the edges are given a value of 1. Pixels next to pixels with value i are given the value i+1. This is a so-called Manhattan distance map. In another embodiment, a Euclidean distance map may be computed.

3) Per blocks 806 through 820, saddle points are detected on the distance map. Saddle points are points where the gradient value of the distance function are zero or below a minimal threshold (this threshold has no relation to the threshold of the gradient maxima discussed above in relation to the edge detection) and the point is neither a local maximum or a local minimum of the distance map function. In one embodiment, the gradient of the distance map is computed and the saddle point detected if the gradient value is zero. The point is verified to not be a maximum or a minimum. In one embodiment, this is done by checking that there are in fact points in the neighborhood of the saddle point with both larger and smaller values. This may be accomplished in one pass through the image frame and involves integer additions and comparisons.

4) Saddle points are connected to the actual edge points by forming connecting paths per block 822, and the connecting paths are also marked as edges per block 824. In one embodiment, the saddle points are connected by stepping along the gradient of the distance map function. This may involve two passes through the image frame and only integer additions and comparisons.

5) The resulting "combined" edge map is flood filled per block 826, where every connected region is identified as an object segment. In one embodiment, this is accomplished in two passes. The pixel inheritance is that a pixel inherits its segment from either the pixel above it or to the left as long as there is no edge on the forward pass. And from the pixel down and to the right on the backward pass.

The above-described automated segmentation method offers segmentation of a wide range of generic images. In addition, however, it is extremely computationally efficient—and may be implemented in software for real-time performance on modem personal computers and other types of multi-media processors. Alternatively, the automated segmentation method may be performed with dedicated hardware circuitry.

The methods disclosed herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the methods disclosed herein are not described with reference to any particular programming language. It will be appreciated that a variety of programming languages may be used to implement the teachings of the invention as described herein.

The apparatus to perform the methods disclosed herein may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus or other data communications system.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An automated method for estimating motion of an image segment, the method comprising:
   segmenting an image frame into constituent image segments, wherein the segments are irregularly shaped;
   estimating motion vectors of blocks of pixels in the image frame, wherein the blocks are rectangular in shape;
   determining the blocks which overlap a segment;
   obtaining candidate motion vectors belonging to the segment from the motion vectors of the blocks which overlap the segment; and
   selecting a motion vector for the segment from amongst the candidate motion vectors,
   wherein the method is performed by a microprocessor executing computer-readable code.

2. The method of claim 1, wherein an error metric is computed for each of the candidate motion vectors and the candidate motion vector with a minimal error metric is selected as the motion vector for the segment.

3. The method of claim 1, wherein the segmenting and estimating are performed in parallel.

4. The method of claim 1, wherein each block comprises an eight pixel by eight pixel block.

5. The method of claim 1, wherein the candidate motion vectors include all unique motion vectors of the blocks which overlap the segment.

6. The method of claim 5, wherein the candidate motion vectors further include an average motion vector from all the motion vectors of the blocks which overlap the segment.

7. The method of claim 5, wherein the candidate motion vectors further include a median motion vector from all the motion vectors of the blocks which overlap the segment.

8. A computer apparatus configured for estimating motion of an image segment, the apparatus comprising:
- a processor for executing computer-readable program code;
- memory for storing in an accessible manner computer-readable data;
- computer-readable program code configured to segment an image frame into constituent image segments, wherein the segments are irregularly shaped;
- computer-readable program code configured to estimate motion vectors of blocks of pixels in the image frame, wherein the blocks are rectangular in shape;
- computer-readable program code configured to determine the blocks which overlap a segment;
- computer-readable program code configured to obtain candidate motion vectors belonging to the segment from the motion vectors of the blocks which overlap the segment; and
- computer-readable program code configured to select a motion vector for the segment from amongst the candidate motion vectors.

9. The apparatus of claim 8, wherein an error metric is computed for each of the candidate motion vectors and the candidate motion vector with a minimal error metric is selected as the motion vector for the segment.

10. The apparatus of claim 8, wherein the segmenting and estimating are performed in parallel.

11. The apparatus of claim 8, wherein each block comprises an eight pixel by eight pixel block.

12. The apparatus of claim 8, wherein the candidate motion vectors include all unique motion vectors of the blocks which overlap the segment.

13. The apparatus of claim 8, wherein the candidate motion vectors further include an average motion vector from all the motion vectors of the blocks which overlap the segment.

14. The apparatus of claim 8, wherein the candidate motion vectors further include a median motion vector from all the motion vectors of the blocks which overlap the segment.

* * * * *